United States Patent
Akl et al.

(10) Patent No.: US 12,356,247 B2
(45) Date of Patent: Jul. 8, 2025

(54) TIME STAMPS FOR DATA PACKETS WITHIN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Ozcan Ozturk, San Diego, CA (US); Karl Georg Hampel, Jersey City, NJ (US); Navid Abedini, Basking Ridge, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 17/650,429

(22) Filed: Feb. 9, 2022

(65) Prior Publication Data
US 2022/0322144 A1   Oct. 6, 2022

Related U.S. Application Data

(60) Provisional application No. 63/169,697, filed on Apr. 1, 2021.

(51) Int. Cl.
| | |
|---|---|
| *H04W 28/08* | (2023.01) |
| *H04L 27/26* | (2006.01) |
| *H04W 28/06* | (2009.01) |
| *H04W 88/14* | (2009.01) |

(52) U.S. Cl.
CPC ... *H04W 28/0908* (2020.05); *H04L 27/26025* (2021.01); *H04W 28/06* (2013.01); *H04W 88/14* (2013.01)

(58) Field of Classification Search
CPC . H04W 28/0908; H04W 28/06; H04W 88/14; H04L 27/26025
See application file for complete search history.

(56) References Cited

U.S. PATENT DOCUMENTS

2020/0145952 A1 *  5/2020  Keskitalo ............ H04W 56/007

FOREIGN PATENT DOCUMENTS

| KR | 20230059786 A | * | 5/2023 | |
|---|---|---|---|---|
| WO | WO-2022151295 A1 | * | 7/2022 | |
| WO | WO-2022199506 A1 | * | 9/2022 | |
| WO | WO-2022212369 A1 | * | 10/2022 | ............ H04L 45/121 |

* cited by examiner

*Primary Examiner* — Mohammad S Adhami
*Assistant Examiner* — Samuel Dilan Rutnam
(74) *Attorney, Agent, or Firm* — Harrity & Harrity, LLP

(57) ABSTRACT

Various aspects of the present disclosure generally relate to wireless communication. In some aspects, an integrated access and backhaul (IAB) node may receive a data packet associated with a timing parameter. The IAB may insert a time stamp into the data packet, based at least in part on the timing parameter, the time stamp associated with a reference time that is known among one or more additional IAB nodes within a path associated with the data packet. Numerous other aspects are described.

30 Claims, 10 Drawing Sheets

TIME STAMPS FOR DATA PACKETS WITHIN AN INTEGRATED ACCESS AND BACKHAUL NETWORK

CROSS-REFERENCE TO RELATED APPLICATION

This patent application claims priority to U.S. Provisional Patent Application No. 63/169,697, filed on Apr. 1, 2021, entitled "TIME STAMPS FOR DATA PACKETS WITHIN AN INTEGRATED ACCESS AND BACKHAUL NETWORK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for time stamps for data packets within an integrated access and backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an integrated access and backhaul (IAB) node includes receiving a data packet associated with a timing parameter; and inserting a time stamp into the data packet, based at least in part on the timing parameter, the time stamp associated with a reference time that is known among one or more additional IAB nodes within a path associated with the data packet.

In some aspects, a method of wireless communication performed by an IAB node includes receiving a data packet having a time stamp associated with a reference time that is known among one or more additional IAB nodes within a path associated with the data packet; and selectively: transmitting the data packet based at least in part on the time stamp and a current time, or discarding the data packet based at least in part on the time stamp and the current time.

In some aspects, a IAB node for wireless communication includes a memory; and one or more processors, coupled to the memory, the memory storing instructions executable by the one or more processors to cause the IAB node to: receive a data packet associated with a timing parameter; and insert a time stamp into the data packet, based at least in part on the timing parameter, the time stamp associated with a reference time that is known among one or more additional IAB nodes within a path associated with the data packet.

In some aspects, an IAB node for wireless communication includes a memory; and one or more processors, coupled to the memory, the memory storing instructions executable by the one or more processors to cause the IAB node to: receive a data packet having a time stamp associated with a reference time that is known among one or more additional IAB nodes within a path associated with the data packet; and selectively: transmit the data packet based at least in part on the time stamp and a current time, or discard the data packet based at least in part on the time stamp and the current time.

In some aspects, a non-transitory computer-readable medium stores a set of instructions for wireless communication includes one or more instructions that, when executed by one or more processors of an IAB node, cause the IAB node to: receive a data packet associated with a timing parameter; and insert a time stamp into the data packet, based at least in part on the timing parameter, the time stamp associated with a reference time that is known among one or more additional IAB nodes within a path associated with the data packet.

In some aspects, a non-transitory computer-readable medium stores a set of instructions for wireless communication includes one or more instructions that, when executed by one or more processors of an IAB node, cause the IAB node to: transmit the data packet based at least in part on the time stamp and a current time, or discard the data packet based at least in part on the time stamp and the current time.

In some aspects, an apparatus for wireless communication includes means for receiving a data packet associated with a timing parameter; and means for inserting a time stamp into the data packet, based at least in part on the timing parameter, the time stamp associated with a reference time that is known among one or more IAB nodes within a path associated with the data packet.

In some aspects, an apparatus for wireless communication includes means for receiving a data packet having a time stamp associated with a reference time that is known among one or more additional IAB nodes within a path associated with the data packet and means for selectively transmitting the data packet based at least in part on the time stamp and a current time or discarding the data packet based at least in part on the time stamp and the current time.

In some aspects, a method, device, apparatus, computer program product, non-transitory computer-readable medium, user equipment, base station, node, wireless communication device, and/or processing system as substantially described herein with reference to and as illustrated by the accompanying drawings and specification Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
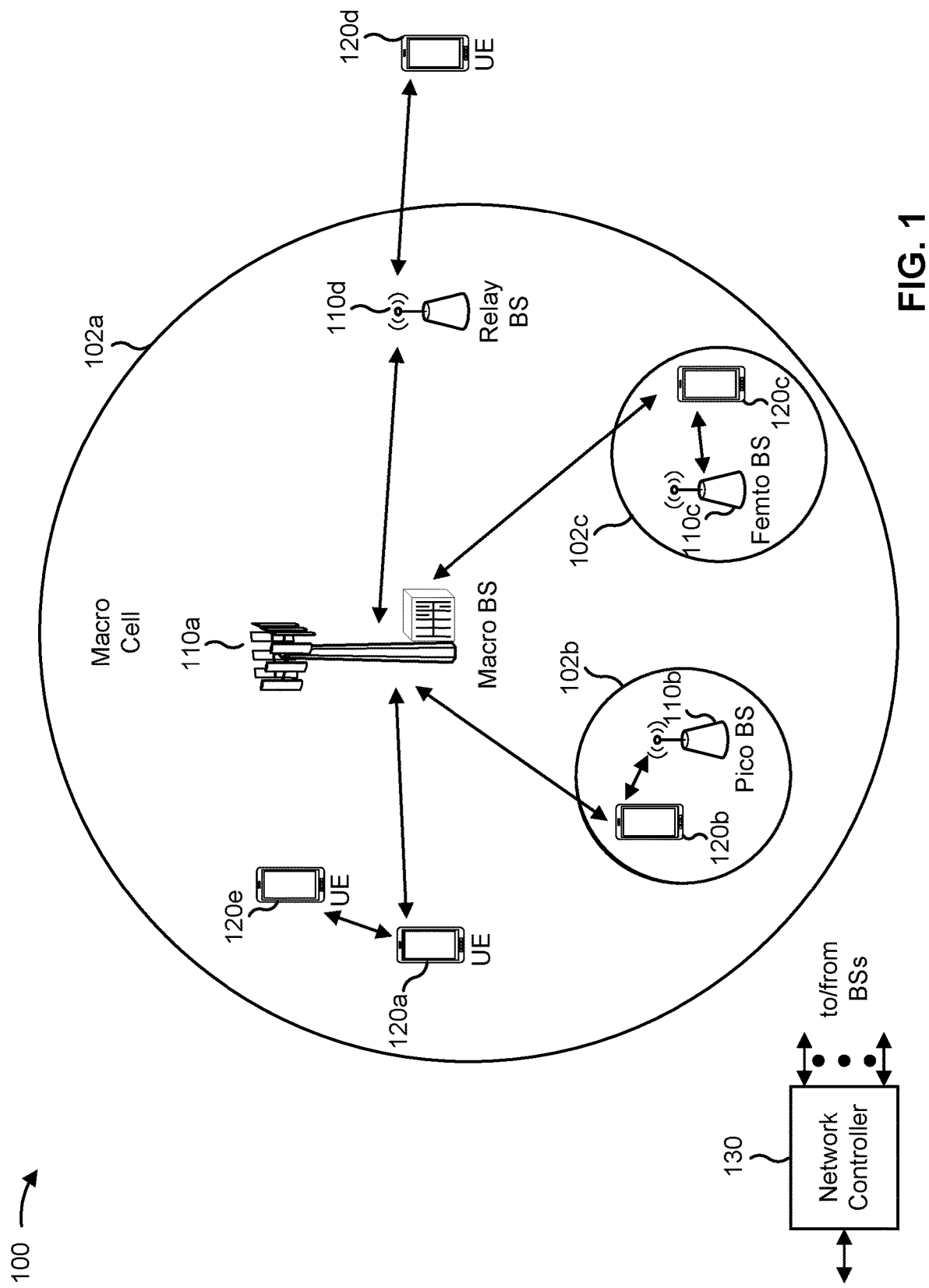
FIG. 1 is a diagram illustrating an example of a wireless network, in accordance with the present disclosure.

In some wireless networks, data packets associated with timing parameters may be carried through an IAB network. The data packet may be carried through the IAB network with delay (e.g., backhaul delay). If the delay fails to satisfy the timing parameters (e.g., the data packet expires), further transmission of the data packet consumes network resources that may otherwise be used to transmit unexpired data packets.

In some aspects described herein, a first IAB node may insert a time stamp, into a data packet, with the time stamp associated with a reference time that is known among one or more additional IAB nodes within a path associated with the data packet. In some aspects, this may obviate a need for an absolute time stamp within the data packet, which absolute time stamp may be cost prohibited based at least in part on a number of bits required to provide an absolute time stamp. Additionally, or alternatively, the time stamp may have a resolution that may be configured to correspond with a length of a set of slots and/or a set of subframes.

A second IAB node may receive the data packet and determine whether the data packet is expired based at least in part on the time stamp and the reference time. The second IAB node may transmit the data packet based at least in part on the data packet being unexpired or may discard the data packet based at least in part on the data packet being expired. In some aspects, the second IAB node may modify a path and/or a radio link control (RLC) channel used to transmit the data packet based at least in part on the time stamp and the reference time. For example, the second IAB node may prioritize the data packet (e.g., with RLC channel routing and/or a path, among other examples) based at least in part on whether the data packet is expired or is nearing expiration (e.g., within a threshold amount of time from expiration and/or with an amount of time per remaining hop satisfying a threshold, among other examples).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
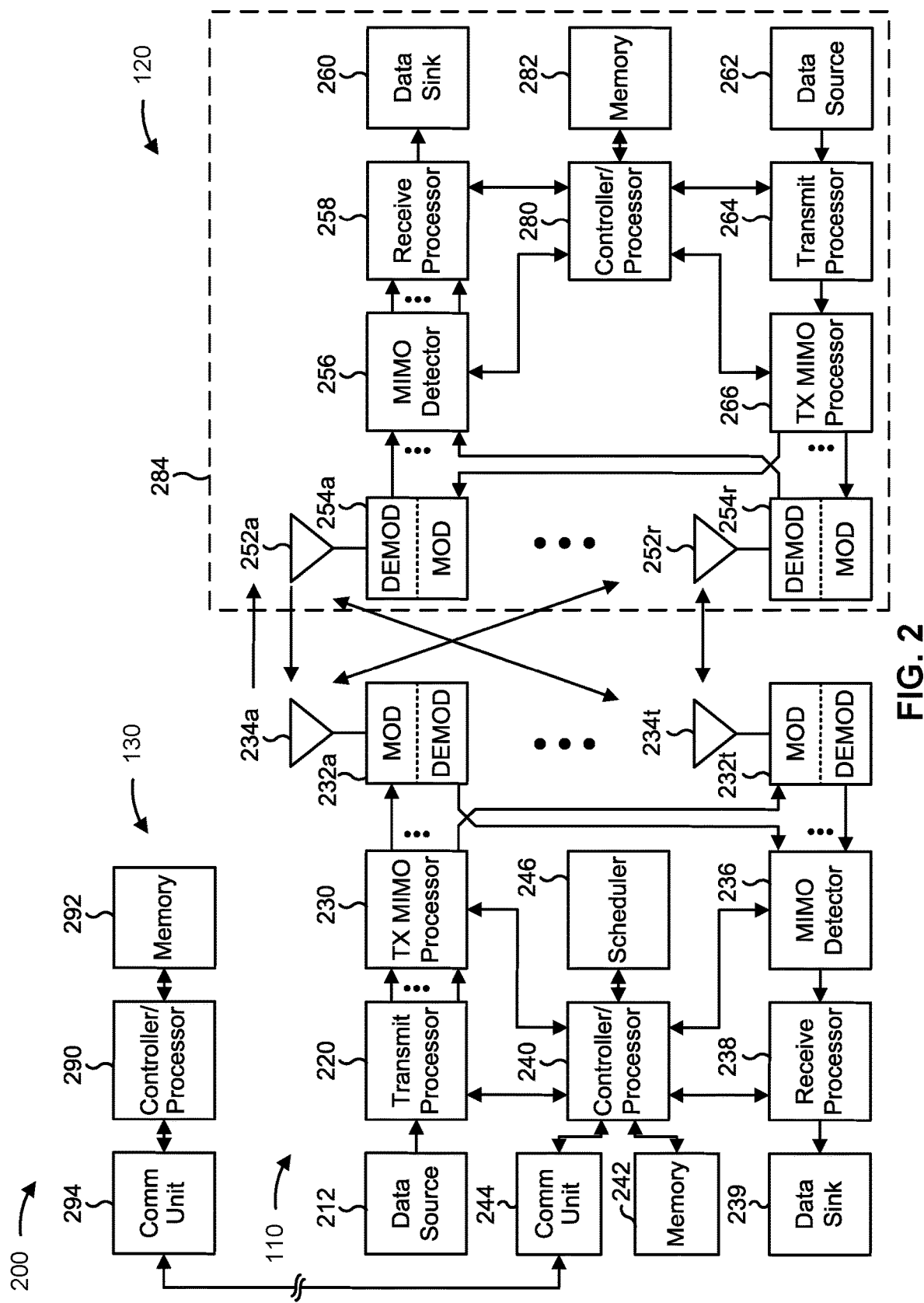
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with time stamps for data packets within an integrated access and backhaul network, as described in more detail elsewhere herein. In some aspects, the IAB node described herein may include the base station 110, is included in the base station 110, or includes one or more components of the base station 110 shown in FIG. 2, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the IAB node includes means for receiving a data packet associated with a timing parameter; or means for inserting a time stamp into the data packet, based at least in part on the timing parameter, the time stamp associated with a reference time that is known among one or more additional IAB nodes within a path associated with the data packet. In some aspects, the means for the IAB node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the IAB node includes receiving a data packet having a time stamp associated with a reference time that is known among one or more additional IAB nodes within a path associated with the data packet; or selectively: means for transmitting the data packet based at least in part on the time stamp and a current time, or means for discarding the data packet based at least in part on the time stamp and the current time. In some aspects, the means for the IAB node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
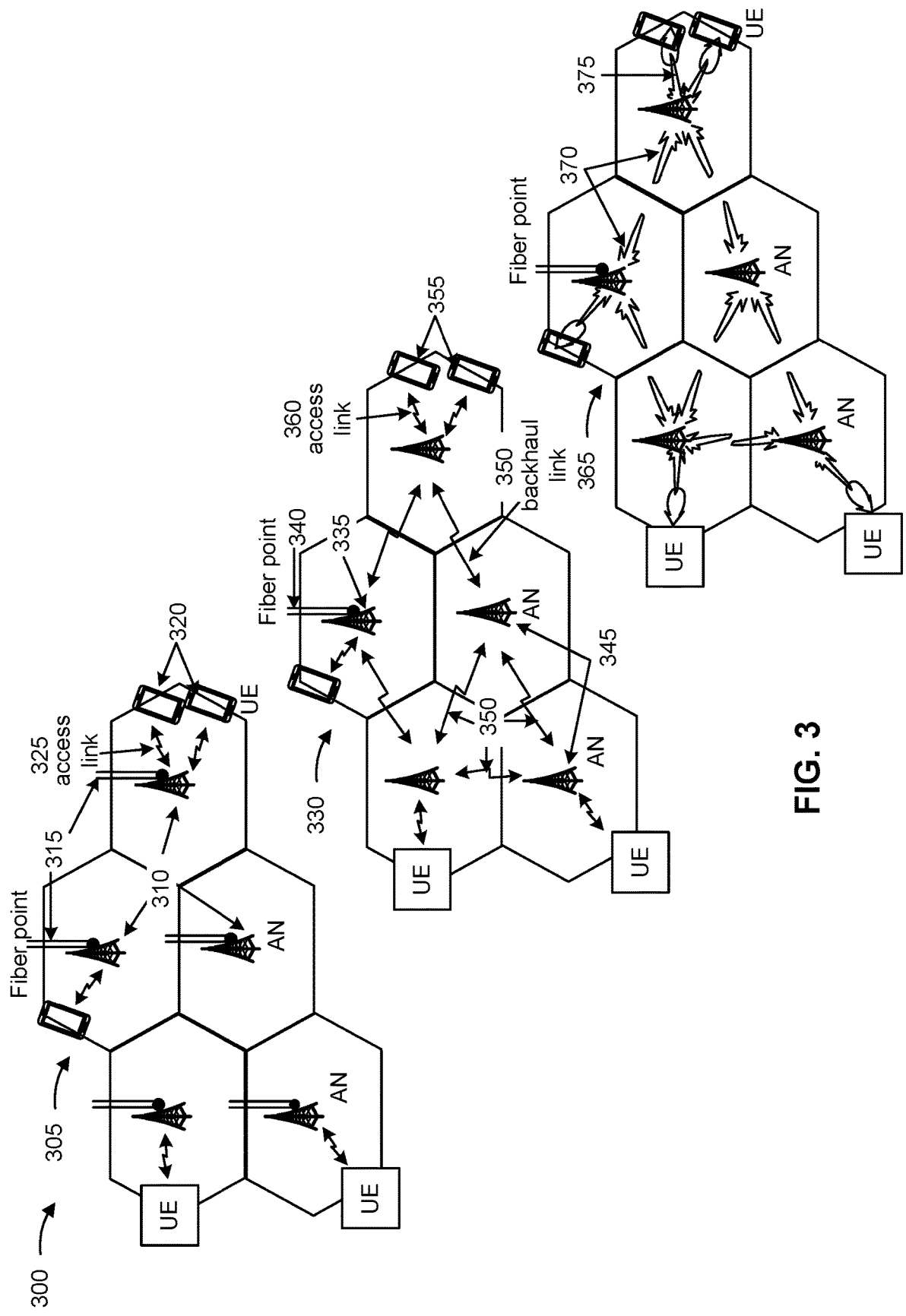
FIG. 3 is a diagram illustrating an example of a radio access network, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340 (e.g., a wireline backhaul), such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station). The IAB network may be associated with a delay along a transmission path through the IAB network. In some aspects, the delay may include one or more segments of delays as a data packet is carried along multiple hops through the IAB network.

As indicated above, FIG. 3 is provided as an example. Other examples may differ from what is described with regard to FIG. 3.

Figure 4:
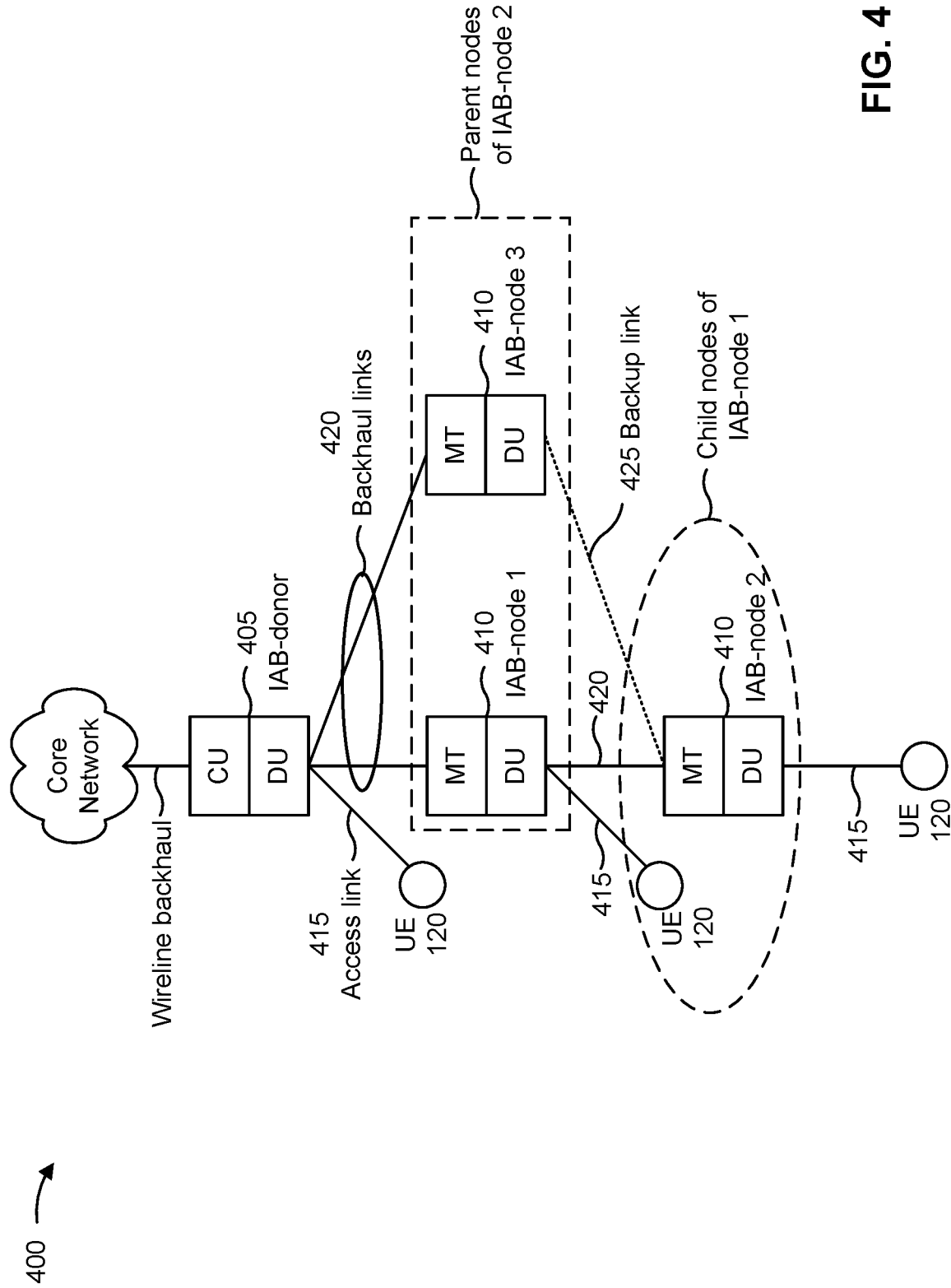
FIG. 4 is a diagram illustrating an example of an integrated access and backhaul network (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., a mobile terminal (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

Each of the backhaul links 420 may be associated with a segment of a delay along one or more paths through the IAB network. The IAB-nodes 410 may be unaware of delays along one or more other segments along the one or more paths through the IAB network and/or may be unaware of whether a packet is expired.

As indicated above, FIG. 4 is provided as an example. Other examples may differ from what is described with regard to FIG. 4.

Figure 5:
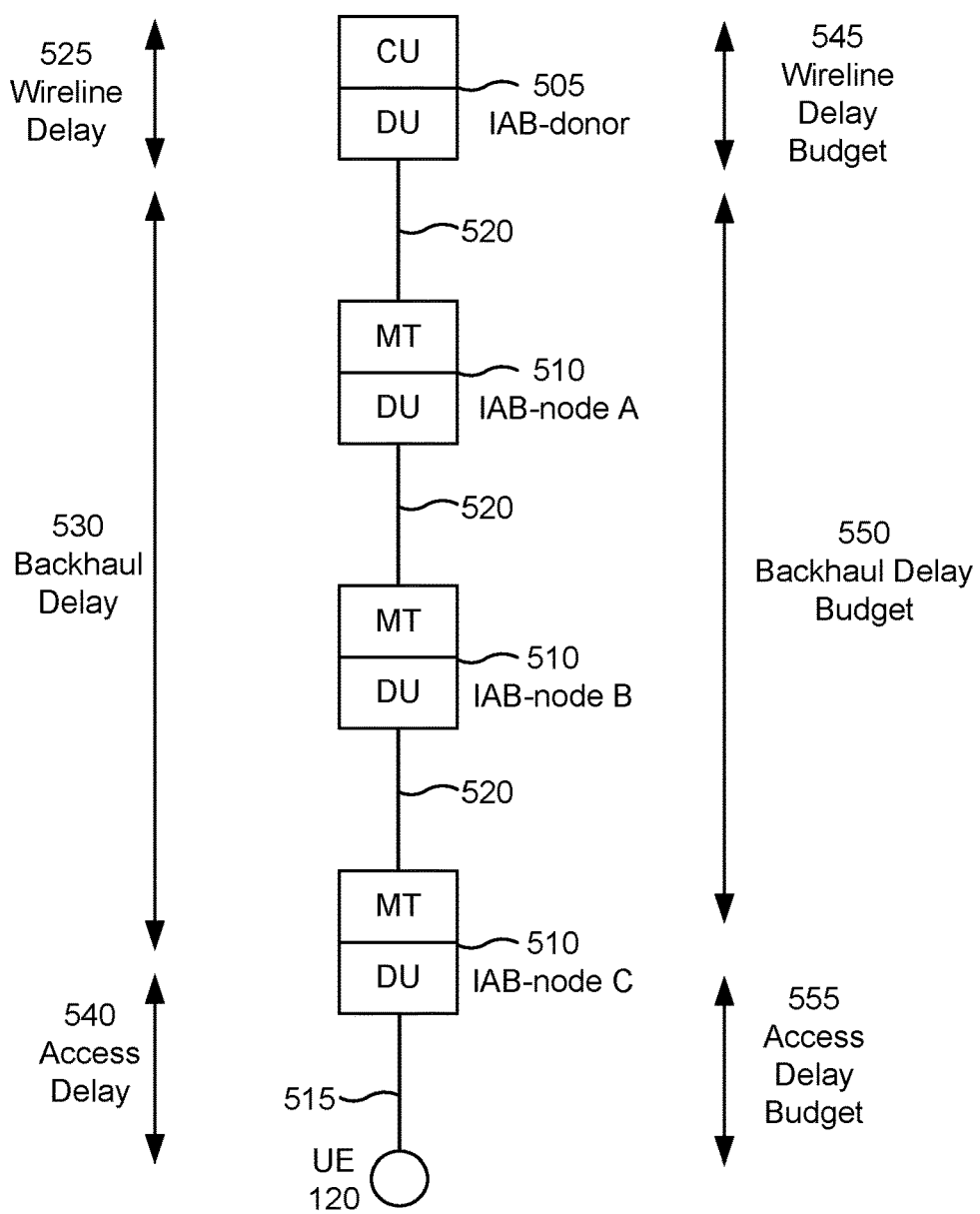
FIG. 5 is a diagram illustrating an example of packet delay through an IAB network, in accordance with the present disclosure.

FIG. 5 is a diagram illustrating an example 500 of packet delay through an IAB network, in accordance with the present disclosure.

As shown in FIG. 5, an IAB-donor may include a CU and a DU and/or an IAB node. The CU may provide a connection to a user plane function (UPF) device, such as a server or a network device. The CU may connect to the UPF device via a core network. The CU may provide an entry point (e.g., ingress) into the IAB network if the data packet is a downlink data packet, or the CU may provide an exit point (e.g., egress) out of the IAB network if the data packet is an uplink data packet. The DU may provide an entry point into a backhaul adaptation protocol (BAP) layer (e.g., a layer 2 routing protocol) if the data packet is a downlink data packet, or the DU may provide an exit point out of the BAP layer if the data packet is an uplink data packet. An access IAB node (e.g., IAB-node C 510) may provide an entry point into the BAP layer if the data packet is an uplink data packet, or the access IAB node may provide an exit point out of the BAP layer if the data packet is a downlink data packet.

The IAB-donor 505 may include a DU that communicates, via a backhaul link 520, with MTs of one or more child nodes, such as IAB-node A 510. The DU of IAB-donor 505 may control (e.g., schedule) communications with the one or more child nodes via the MTs. A DU of IAB-node A 510 may communicate, via a backhaul link 520, with MTs of one or more child nodes, such as IAB-node B 510. A DU of IAB-node B 510 may communicate, via a backhaul link 520, with MTs of one or more child nodes, such as IAB-node C 510. A DU of IAB-node C 510 may communicate, via an access link 515, with a UE 120.

Communication within the IAB-donor 505 (e.g., between the CU and the DU) may be associated with a wireline delay 525. Communication across the IAB network may be associated with a backhaul delay 530. Communication between the IAB-node C and the UE 120 may be associated with an access delay 540. If a total delay satisfies a threshold, a data packet may be expired. However, the IAB-nodes 510 may be unaware of a total delay and/or whether the total delay satisfies the threshold.

A data packet may be associated with a wireline delay budget 545, a backhaul delay budget 550, and an access delay budget 555. The IAB-donor 505 (e.g., the CU) may select a route and/or an RLC channel to carry the data packet through the IAB network. The RLC channel may be associated with a backhaul delay budget (e.g., an RLC channel packet delay budget (PDB)) that may be assigned to the data packet as the backhaul delay budget 550. The backhaul delay budget may be associated with an entire route through the IAB network, and may not be segmented according to individual hops within the IAB network. A BAP header may not include a time stamp, and the IAB-nodes 510 may be unaware of whether the data packet is expired. Additionally, or alternatively, the data packet may be associated with a delay budget (e.g., CN_PDB) for delay between a core network (CN) associated with the IAB network and a user plane function (UPF) device.

If a data packet is carried through multiple hops with an excess delay budget (e.g., less than all of the delay budget is consumed), and then fails to satisfy an additional delay budget, an IAB-node that determines that the data packet fails to satisfy the additional delay budget may discard the data packet. However, the data packet may have remained within a total packet delay budget for the IAB network based at least in part on the excess delay budget accumulated during the multiple hops. In other words, the data packet may be discarded when the data packet has not expired from a perspective of the total packet delay budget for the IAB network.

Alternatively, the IAB network may use a single backhaul delay budget 550 instead of backhaul delay budgets for each hop of the IAB network. However, IAB-nodes 510 within the IAB network may be unaware if a data packet has already expired while in the IAB network and may continue to forward the data packet until the data packet reaches an access IAB-node (e.g., IAB-node C 510). This may consume computing, network, and/or power resource of the IAB network to forward expired data packets within the IAB network. Additionally, or alternatively, the IAB-nodes 510 may be unaware that a data packet is nearing expiration, and the IAB-nodes 510 may fail to prioritize scheduling the data packet for transmission, which may increase a number of expired data packets within the IAB network.

As indicated above, FIG. 5 is provided as an example. Other examples may differ from what is described with regard to FIG. 5.

In some aspects described herein, a first IAB node may insert a time stamp, into a data packet, with the time stamp associated with a reference time that is known among one or more additional IAB nodes within a path associated with the data packet. In some aspects, this may obviate a need for an absolute time stamp within the data packet, which absolute time stamp may be cost prohibitive based at least in part on a number of bits required to provide an absolute time stamp. Additionally, or alternatively, the time stamp may have a resolution that may be configured to correspond with a length of a set of slots and/or a set of subframes.

A second IAB node may receive the data packet and determine whether the data packet is expired based at least in part on the time stamp and the reference time. The second IAB node may transmit the data packet based at least in part on the data packet being unexpired or may discard the data packet based at least in part on the data packet being expired.

In some aspects, the second IAB node may modify a path and/or an RLC channel used to transmit the data packet based at least in part on the time stamp and the reference time. For example, the second IAB node may prioritize the data packet based at least in part on the time stamp and the reference time (e.g., based at least in part on the time stamp indicating a total and/or remaining delay budget associated with the data packet). For example, the second IAB node may prioritize the data packet based at least in part on whether the data packet is expired or is nearing expiration (e.g., within a threshold amount of time from expiration and/or with an amount of time per remaining hop satisfying a threshold, among other examples). The second IAB node may prioritize the data packet based at least in part on prioritizing the data packet among data packets (e.g., associated with a same quality of service (QoS)) within a same RLC channel.

Based at least in part on the time stamp being associated with a time known to the second IAB node and the first IAB node, the time stamp may be indicated using a reduced number of bits, which reduced number of bits may reduce overhead consumed to provide the time stamp. The reduced overhead may facilitate use of time stamps within the IAB network, which may reduce transmission of expired data packets within the IAB network, which may improve latency of unexpired packets and/or reduce resources of the IAB network that are consumed by expired data packets.

Figure 6:
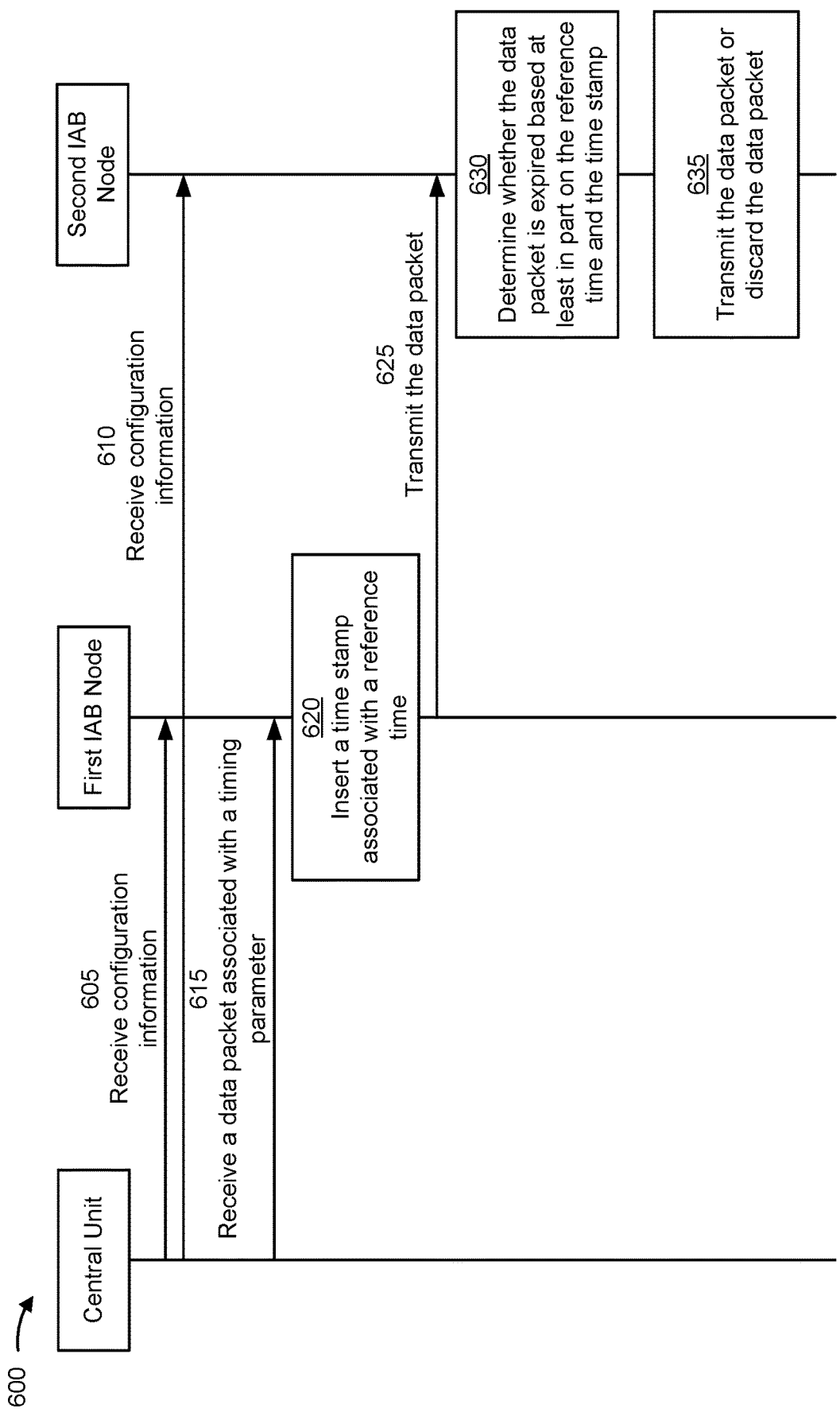
FIG. 6 is a diagram illustrating an example associated with time stamps for data packets within an IAB network, in accordance with the present disclosure.

FIG. 6 is a diagram illustrating an example 600 associated with time stamps for data packets within an IAB network, in accordance with the present disclosure. In some aspects, a first IAB node may include a DU and/or a CU of a same IAB node.

As shown by reference number 605, the first IAB node may receive, and the CU (e.g., of an IAB node) may transmit, configuration information. In some aspects, the configuration information may indicate a format for indicating time stamps and/or reference times for data packets within the IAB network. In some aspects, the configuration information my indicate a reference time to use for data packets within the IAB network. In some aspects, the configuration information may indicate a format for inserting a time stamp, a format for inserting a reference time, a format for indicating presence of the time stamp, and/or selecting a time stamp. In some aspects, the configuration information may indicate a number of bits allocated for time stamps and/or a resolution of time stamps.

As shown by reference number 610, a second IAB node may receive, and the CU may transmit, configuration information. In some aspects, the configuration information may indicate a format for indicating time stamps and/or reference times for data packets within the IAB network. In some aspects, the configuration information my indicate a reference time to use for data packets within the IAB network. In some aspects, the configuration information may indicate a number of bits allocated for time stamps and/or a resolution of time stamps.

As shown by reference number 615, the first IAB node may receive, and the CU may transmit a data packet associated with a timing parameter. In some aspects, the timing parameter may be associated with a quality of service (QoS) parameter. For example, the data packet may have an associated latency requirement. In some aspects, the CU may determine a format for a time stamp, a reference time for the time stamp, a numerology, and/or a time range (e.g., a period or a portion of a period associated with periodicity) for the reference time, among other examples.

As shown by reference number 620, the first IAB node may insert a time stamp associated with a reference time. In some aspects, the data header may include an indication that the time stamp is included in the data packet. For example, the first IAB node may insert the indication that the data packet includes the time stamp. In some aspects, the time stamp may be inserted within, or following, a header of the data packet.

In some aspects, the first IAB node may insert the time stamp into the data packet received from a central unit, as described in connection with reference number 615, or another network node. In some aspects, the first IAB may generate the data packet and insert the time stamp into the generated data packet. For example, the first IAB node may generate a data packet (e.g., without receiving the data packet from another node) and insert a time stamp into a BAP header of the data packet. As further described in connection with FIG. 6, the first IAB node may then transmit the data packet, generated by the first IAB node, to another IAB-node (e.g., the second IAB node). Examples of such types of data packets that the first IAB node may generate and transmit in the BAP layer include F1-C (F1 Control plane interface) traffic or non-F1 traffic, among other examples.

In some aspects, the time stamp may be indicated using a number of bits that are allocated for the time stamp or using a number of bits based at least in part on an indicated resolution of the time stamp. In some aspects, the number of bits allocated for inserting the time stamp or the resolution of the time stamp may be based at least in part on an indication within configuration information and/or within a communication protocol. For example, the number of bits allocated for inserting the time stamp or the resolution of the time stamp may be based at least in part on internet protocol (IP) header fields of the data packet received (e.g., the first IAB-node may be a donor-DU in a downlink example). In some aspects, the number of bits allocated for inserting the time stamp or the resolution of the time stamp may be based on a traffic type associated with the data packet (e.g., a traffic type associated with an F1 user (e.g., F1-U) tunnel). For example, the first IAB-node may be an access IAB-node receiving an uplink packet from a child such as a UE or IAB-MT.

In some aspects, the number of bits allocated for inserting the time stamp or the resolution of the time stamp may be based at least in part on an indication within a header of the data packet. In some aspects, the indication within the header of the data packet is based at least in part on a traffic type of the data packet, a channel mapping associated with the data packet, and/or a number of hops on the path associated with the data packet. In some aspects, the first IAB node may determine the number of bits allocated for inserting the time stamp or the resolution of the time stamp based at least in part on the information within, or associated with, the data packet.

In some aspects, the resolution may be based at least in part on a numerology of one or more of a slot or a subframe associated with the data packet. For example, the resolution may correspond to an amount of time that is less than a length of time for a configured number of slots (e.g., 1 slot) or subframes (e.g., 1 subframe), among other examples. In some aspects, the time stamp may indicate a frame, a subframe, a slot, or a symbol associated with a numerology configured for the one or more additional IAB nodes, based at least in part on the resolution.

In some aspects, the reference time may be known among one or more (e.g., all) IAB nodes within one or more paths associated with the data packet. In some aspects, the one or more paths associated with the data packet may include a backhaul adaptation protocol path. In some aspects, the reference time may be associated with a reference time associated with absolute time. For example, the reference time may be a periodically resetting time period based at least in part on a network clock (e.g., a global positioning system (GPS)-based clock). The reference time may be based at least in part on, for example, 10 second intervals beginning at an hour and/or minute of the day. The time stamp may be associated with an occasion of the reference time.

In some aspects, the reference time may be numerology-based. For example, the reference time may be a periodic time unit within a communication protocol. In some aspects, the reference time may be associated with one or more system frame numbers (SFNs) within a set of SFNs (e.g., within a set of periodically resetting SFNs). In some aspects, the reference time may have a periodicity (e.g., half of a slot frame number period) to provide a desired resolution for the time stamp (e.g., to correspond with a smaller number of slots).

As shown by reference number 625, the first IAB node may transmit, and the second IAB node may receive, the data packet after inserting the time stamp.

As shown by reference number 630, the second IAB node may determine whether the data packet is expired based at least in part on the reference time and the time stamp. In some aspects, the reference time may be indicated with the data packet and/or within the configuration information. In some aspects, an indication of the reference time may include an explicit indication of the reference time within a header of the data packet, a partial indication of the reference time within a header of the data packet, and/or a configuration message received prior to the data packet.

As shown by reference number 635, the second IAB node may transmit the data packet or discard the data packet based at least in part on whether the data packet is expired. In some aspects, the second IAB node may determine to transmit the data packet based at least in part on the data packet not being expired, transmit the data packet based at least in part on the data packet having a likelihood of passing through the IAB network before expiration satisfying a threshold, discard the data packet based at least in part on the data packet being expired, or transmit the data packet based at least in part on the data packet having a likelihood of passing through the IAB network before expiring that fails to satisfy the threshold, among other examples.

In some aspects, the second IAB node may modify a priority of the data packet, modify a path of the data packet, and/or modify an RLC channel used to transmit the data packet based at least in part on the time stamp and/or the reference time. For example, the second IAB node may increase a priority of the data packet based at least in part on the data packet having a threshold amount of remaining delay budget, and/or based at least in part on a satisfying a threshold ratio of remaining delay budget to remaining number of hops, among other examples.

Based at least in part on the time stamp being associated with a time known to the second IAB node and the first IAB node, the time stamp may be indicated using a reduced number of bits, which reduced number of bits may reduce overhead consumed to provide the time stamp. The reduced overhead may facilitate use of time stamps within the IAB network, which may reduce transmission of expired data packets within the IAB network, which may improve latency of unexpired patents and/or reduce resources of the IAB network that are consumed by expired data packets.

As indicated above, FIG. 6 is provided as an example. Other examples may differ from what is described with regard to FIG. 6.

Figure 7:
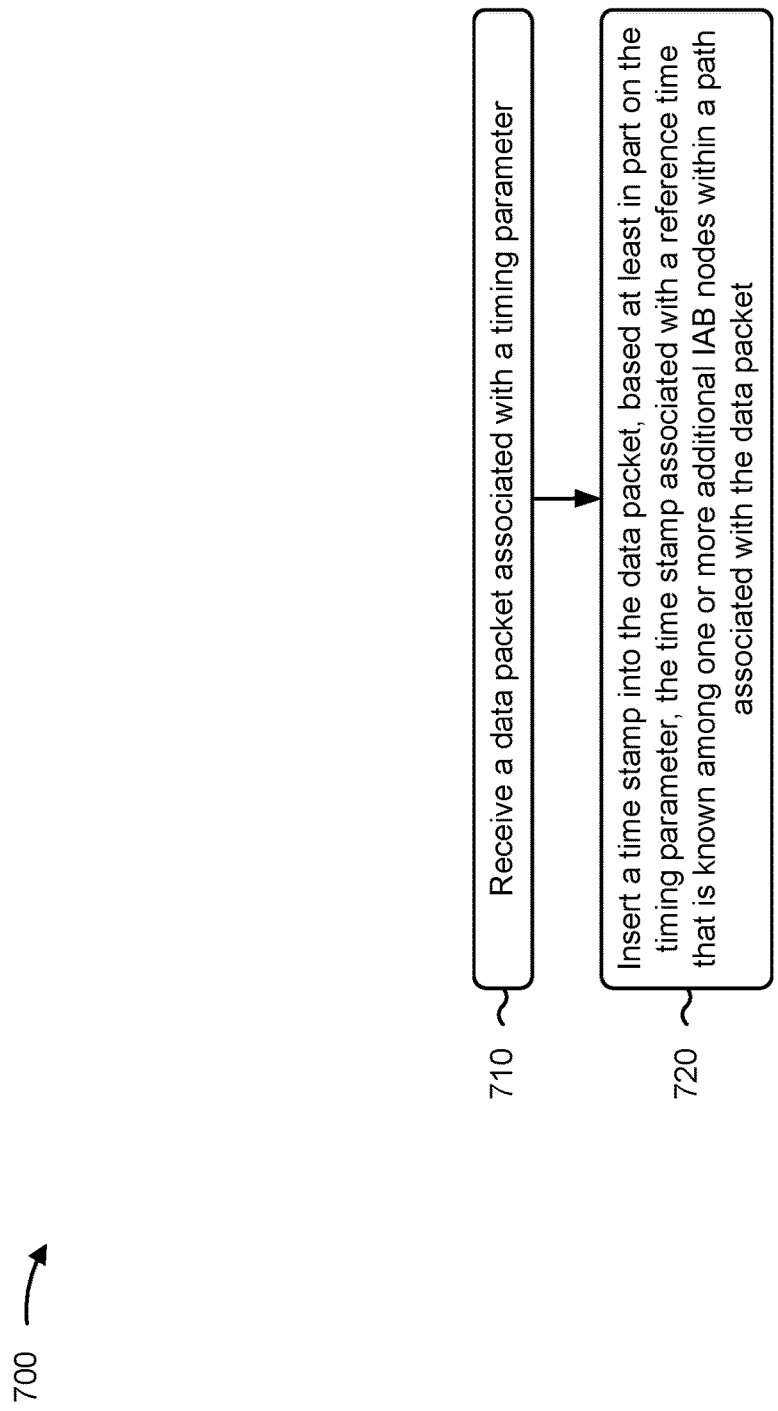
FIGS. 7 and 8 are diagrams illustrating example processes associated with time stamps for data packets within an IAB network, in accordance with the present disclosure.

FIG. 7 is a diagram illustrating an example process 700 performed, for example, by an IAB node, in accordance with the present disclosure. Example process 700 is an example where the IAB node (e.g., the first IAB node and/or IAB-donor 505, among other examples) performs operations associated with time stamps for data packets within an IAB network.

As shown in FIG. 7, in some aspects, process 700 may include receiving a data packet associated with a timing parameter (block 710). For example, the IAB node (e.g., using reception component 902, depicted in FIG. 9) may receive a data packet associated with a timing parameter, as described above. In some aspects, block 710 may be optional. For example, the IAB node may generate the data packet without receiving the data packet described in connection with block 710.

As further shown in FIG. 7, in some aspects, process 700 may include inserting a time stamp into the data packet, based at least in part on the timing parameter, the time stamp associated with a reference time that is known among one or more additional IAB nodes within a path associated with the data packet (block 720). For example, the IAB node (e.g., using communication manager 908, depicted in FIG. 9) may insert a time stamp into the data packet, based at least in part on the timing parameter, the time stamp associated with a reference time that is known among one or more additional IAB nodes within a path associated with the data packet, as described above.

Process 700 may include additional aspects, such as any single aspect or any combination of aspects described below and/or in connection with one or more other processes described elsewhere herein.

In a first aspect, the timing parameter is associated with a quality of service parameter.

In a second aspect, alone or in combination with the first aspect, process 700 includes transmitting the data packet after inserting the time stamp.

In a third aspect, alone or in combination with one or more of the first and second aspects, the path associated with the data packet comprises a backhaul adaptation protocol path.

In a fourth aspect, alone or in combination with one or more of the first through third aspects, an indication of the time stamp is based at least in part on one or more of a number of bits allocated for inserting the time stamp, or a resolution of the time stamp.

In a fifth aspect, alone or in combination with one or more of the first through fourth aspects, the resolution is associated with a numerology of one or more of a slot or a subframe associated with the data packet.

In a sixth aspect, alone or in combination with one or more of the first through fifth aspects, one or more of the number of bits allocated for inserting the time stamp or the resolution of the time stamp is based at least in part on an indication within a header of the data packet.

In a seventh aspect, alone or in combination with one or more of the first through sixth aspects, the indication within the header of the data packet is based at least in part on one or more of a traffic type of the data packet, a channel mapping associated with the data packet, or a number of hops on the path associated with the data packet.

In an eighth aspect, alone or in combination with one or more of the first through seventh aspects, the time stamp indicates one or more of a frame, a subframe, a slot, or a symbol associated with a numerology configured for the one or more additional IAB nodes, or a delta time from the reference time.

In a ninth aspect, alone or in combination with one or more of the first through eighth aspects, process 700 includes receiving an indication of one or more of the reference time, a number bits allocated for inserting the time stamp, or a resolution of the time stamp.

In a tenth aspect, alone or in combination with one or more of the first through ninth aspects, receiving the indication of the reference time comprises receiving an explicit indication of the reference time within a header of the data packet, receiving a partial indication of the reference time within a header of the data packet, or receiving the indication of the reference time in a configuration message received prior to the data packet.

In an eleventh aspect, alone or in combination with one or more of the first through tenth aspects, the reference time is based at least in part on one or more of a periodic numerology-based time, or a periodic time associated with an absolute time.

In a twelfth aspect, alone or in combination with one or more of the first through eleventh aspects, the time stamp is associated with an occasion of the reference time.

In a thirteenth aspect, alone or in combination with one or more of the first through twelfth aspects, the IAB node comprises one or more of an IAB donor DU, or a CU.

In a fourteenth aspect, alone or in combination with one or more of the first through thirteenth aspects, the CU determines, for the reference time, one or more of a format for the time stamp, a reference time, a numerology, or a time range for the reference time.

In a fifteenth aspect, alone or in combination with one or more of the first through fourteenth aspects, process 700 includes inserting, into a header of the data packet, an indication that the data packet includes the time stamp.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
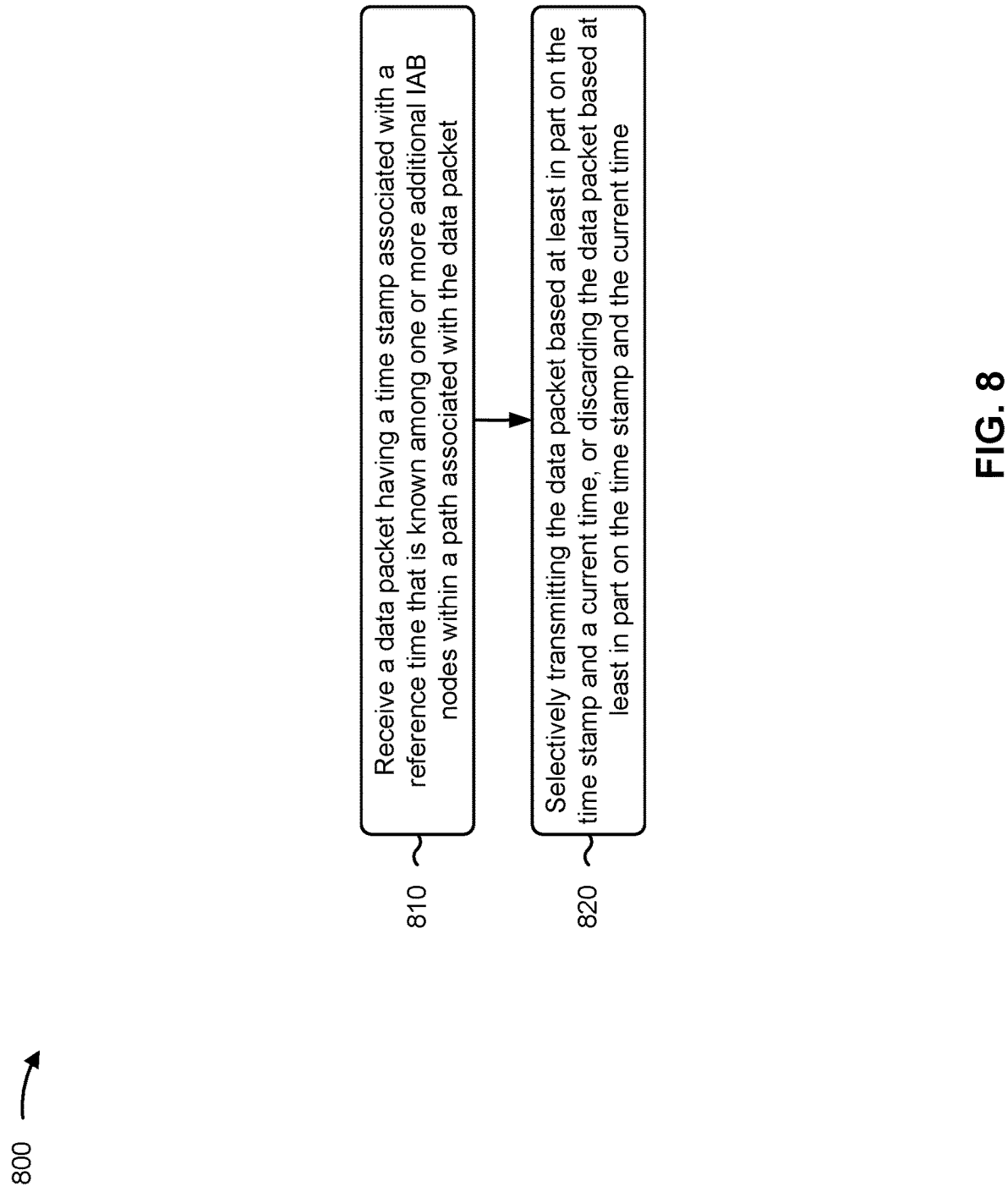

FIG. 8 is a diagram illustrating an example process 800 performed, for example, by an IAB node, in accordance with the present disclosure. Example process 800 is an example where the IAB node (e.g., the second IAB node and/or an IAB-node 510, among other examples) performs operations associated with time stamps for data packets within an integrated access and backhaul network.

As shown in FIG. 8, in some aspects, process 800 may include receiving a data packet having a time stamp associated with a reference time that is known among one or more additional IAB nodes within a path associated with the data packet (block 810). For example, the IAB node (e.g., using reception component 1002, depicted in FIG. 10) may receive a data packet having a time stamp associated with a reference time that is known among one or more additional IAB nodes within a path associated with the data packet, as described above.

As further shown in FIG. 8, in some aspects, process 800 may include selectively: transmitting the data packet based at least in part on the time stamp and a current time, or discarding the data packet based at least in part on the time stamp and the current time (block 820). For example, the IAB node (e.g., using communication manager 1008 and/or transmission component 1004, depicted in FIG. 10) may selectively: transmit the data packet based at least in part on the time stamp and a current time, or discard the data packet based at least in part on the time stamp and the current time, as described above.

Process 800 may include additional aspects, such as any single aspect or any combination of aspects described below and/or in connection with one or more other processes described elsewhere herein.

In a first aspect, process 800 includes transmitting the data packet based at least in part on the time stamp indicating that the data packet is not expired, or discarding the data packet based at least in part on the time stamp indicating that the data packet is expired.

In a second aspect, alone or in combination with the first aspect, the path associated with the data packet comprises a backhaul adaptation protocol path.

In a third aspect, alone or in combination with one or more of the first and second aspects, an indication of the time stamp is based at least in part on one or more of a number of bits allocated for the time stamp, or a resolution of the time stamp.

In a fourth aspect, alone or in combination with one or more of the first through third aspects, the resolution is associated with a numerology of one or more of a slot or a subframe associated with the data packet.

In a fifth aspect, alone or in combination with one or more of the first through fourth aspects, one or more of the number of bits allocated for the time stamp or the resolution of the time stamp is based at least in part on an indication within a header of the data packet.

In a sixth aspect, alone or in combination with one or more of the first through fifth aspects, the indication within the header of the data packet is based at least in part on one or more of a traffic type of the data packet, a channel mapping associated with the data packet, or a number of hops on the path associated with the data packet.

In a seventh aspect, alone or in combination with one or more of the first through sixth aspects, the time stamp indicates one or more of a frame, a subframe, a slot, or a symbol associated with a numerology configured for the one or more additional IAB nodes, or a delta time from the reference time.

In an eighth aspect, alone or in combination with one or more of the first through seventh aspects, process 800 includes receiving an indication of one or more of the reference time, a number bits allocated for the time stamp, or a resolution of the time stamp.

In a ninth aspect, alone or in combination with one or more of the first through eighth aspects, receiving the indication of the reference time comprises receiving an explicit indication of the reference time within a header of the data packet, receiving a partial indication of the reference time within a header of the data packet, or receiving the indication of the reference time in a configuration message received prior to the data packet.

In a tenth aspect, alone or in combination with one or more of the first through ninth aspects, the reference time is based at least in part on one or more of a periodic numerology-based time, or a periodic time associated with an absolute time.

In an eleventh aspect, alone or in combination with one or more of the first through tenth aspects, the time stamp is associated with an occasion of the reference time.

In a twelfth aspect, alone or in combination with one or more of the first through eleventh aspects, process 800 includes determining that the data packet includes a time stamp based at least in part on an indication within a header of the data packet.

In a thirteenth aspect, alone or in combination with one or more of the first through twelfth aspects, process 800 includes determining a scheduling priority for transmitting the data packet based at least in part on the time stamp.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
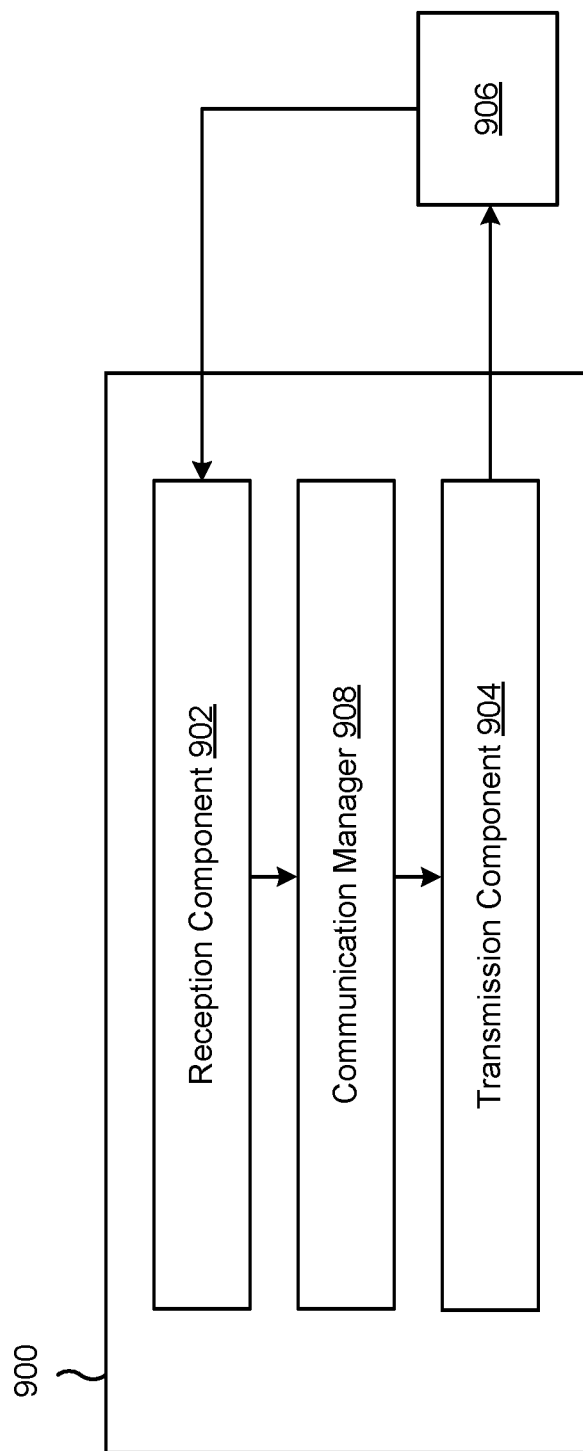
FIGS. 9 and 10 are block diagrams of example apparatuses for wireless communication, in accordance with the present disclosure.

FIG. 9 is a block diagram of an example apparatus 900 for wireless communication. The apparatus 900 may be a IAB node, or a IAB node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station 110 described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the IAB node described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the IAB node described above in connection with FIG. 2. In some aspects, the transmission component 904 may be co-located with the reception component 902 in a transceiver.

The reception component 902 may receive a data packet associated with a timing parameter. The communication manager 908 may insert a time stamp into the data packet, based at least in part on the timing parameter, the time stamp associated with a reference time that is known among one or more additional IAB nodes within a path associated with the data packet.

The transmission component 904 may transmit the data packet after inserting the time stamp.

The reception component 902 may receive an indication of one or more of the reference time, a number bits allocated for inserting the time stamp, or a resolution of the time stamp.

The communication manager 908 may insert, into a header of the data packet, an indication that the data packet includes the time stamp.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
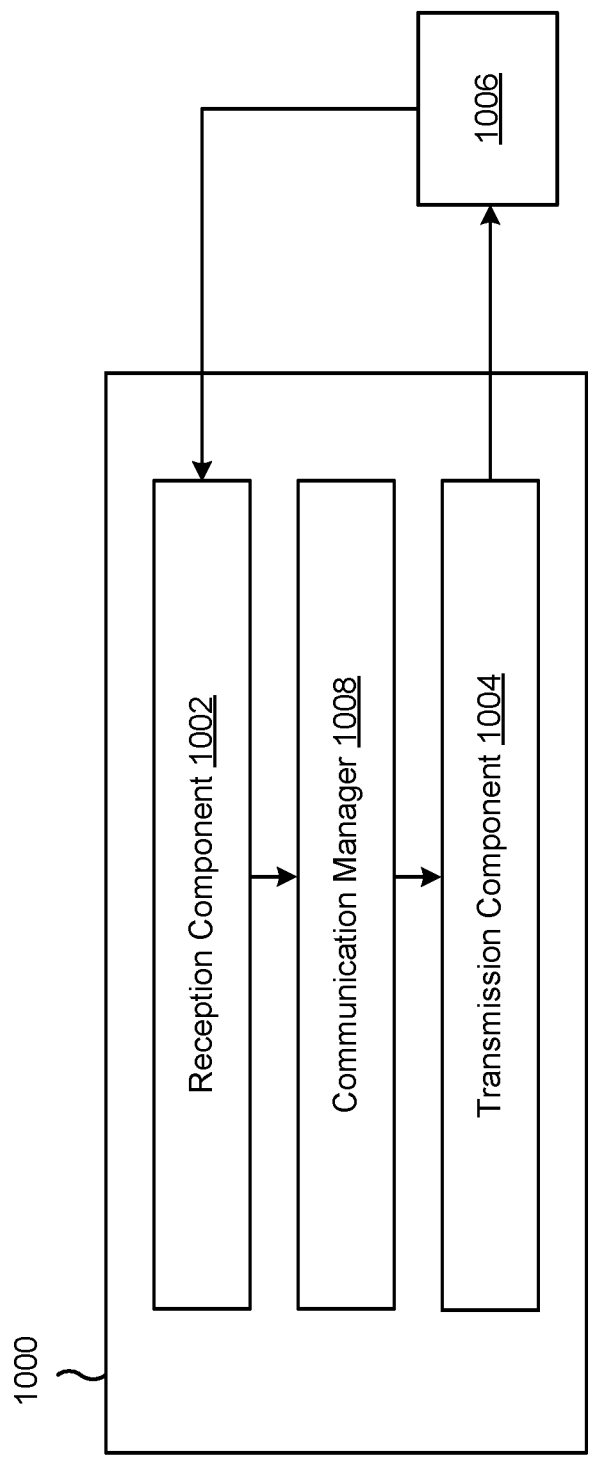

FIG. 10 is a block diagram of an example apparatus 1000 for wireless communication. The apparatus 1000 may be a IAB node, or a IAB node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 4. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station 110 described above in connection with FIG. 2. Additionally, or alternatively, one or more components shown in FIG. 10 may be implemented within one or more components described above in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the IAB node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the IAB node described above in connection with FIG. 2. In some aspects, the transmission component 1004 may be co-located with the reception component 1002 in a transceiver.

The reception component 1002 may receive a data packet having a time stamp associated with a reference time that is known among one or more additional IAB nodes within a path associated with the data packet. The communication manager 1008 and/or the transmission component 1004 may selectively transmitting the data packet based at least in part on the time stamp and a current time, or discarding the data packet based at least in part on the time stamp and the current time.

The transmission component 1004 may transmit the data packet based at least in part on the time stamp indicating that the data packet is not expired.

The communication manager 1008 may discard the data packet based at least in part on the time stamp indicating that the data packet is expired.

The reception component 1002 may receive an indication of one or more of the reference time, a number bits allocated for the time stamp, or a resolution of the time stamp.

The communication manager 1008 may determine that the data packet includes a time stamp based at least in part on an indication within a header of the data packet.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an integrated access and backhaul (IAB) node, comprising: receiving a data packet associated with a timing parameter; and inserting a time stamp into the data packet, based at least in part on the timing parameter, the time stamp associated with a reference time that is known among one or more additional IAB nodes within a path associated with the data packet.

Aspect 2: The method of Aspect 1, wherein the timing parameter is associated with a quality of service parameter.

Aspect 3: The method of any of Aspects 1-2, further comprising: transmitting the data packet after inserting the time stamp.

Aspect 4: The method of any of Aspects 1-3, wherein the path associated with the data packet comprises a backhaul adaptation protocol path.

Aspect 5: The method of any of Aspects 1-4, wherein an indication of the time stamp is based at least in part on one or more of: a number of bits allocated for inserting the time stamp, or a resolution of the time stamp.

Aspect 6: The method of Aspect 5, wherein the resolution is associated with a numerology of one or more of a slot or a subframe associated with the data packet.

Aspect 7: The method of Aspect 5, wherein one or more of the number of bits allocated for inserting the time stamp or the resolution of the time stamp is based at least in part on an indication within a header of the data packet.

Aspect 8: The method of Aspect 7, wherein the indication within the header of the data packet is based at least in part on one or more of: a traffic type of the data packet, a channel mapping associated with the data packet, or a number of hops on the path associated with the data packet.

Aspect 9: The method of any of Aspects 1-8, wherein the time stamp indicates one or more of: a frame, a subframe, a slot, or a symbol associated with a numerology configured for the one or more additional IAB nodes, or a delta time from the reference time.

Aspect 10: The method of any of Aspects 1-9, further comprising receiving an indication of one or more of: the reference time, a number bits allocated for inserting the time stamp, or a resolution of the time stamp.

Aspect 11: The method of Aspect 10, wherein receiving the indication of the reference time comprises: receiving an explicit indication of the reference time within a header of the data packet, receiving a partial indication of the reference time within a header of the data packet, or receiving the indication of the reference time in a configuration message received prior to the data packet.

Aspect 12: The method of any of Aspects 1-11, wherein the reference time is based at least in part on one or more of: a periodic numerology-based time, or a periodic time associated with an absolute time.

Aspect 13: The method of Aspect 12, wherein the time stamp is associated with an occasion of the reference time.

Aspect 14: The method of any of Aspects 1-13, wherein the IAB node comprises one or more of: an IAB donor distributed unit, or a central unit.

Aspect 15: The method of Aspect 14, wherein the central unit determines, for the reference time, one or more of: a format for the time stamp, a reference time, a numerology, or a time range for the reference time.

Aspect 16: The method of any of Aspects 1-15, further comprising: inserting, into a header of the data packet, an indication that the data packet includes the time stamp.

Aspect 17: A method of wireless communication performed by an integrated access and backhaul (IAB) node, comprising: receiving a data packet having a time stamp associated with a reference time that is known among one or more additional IAB nodes within a path associated with the data packet; and selectively: transmitting the data packet based at least in part on the time stamp and a current time, or discarding the data packet based at least in part on the time stamp and the current time.

Aspect 18: The method of Aspect 17, further comprising: transmitting the data packet based at least in part on the time stamp indicating that the data packet is not expired, or discarding the data packet based at least in part on the time stamp indicating that the data packet is expired.

Aspect 19: The method of any of Aspects 17-18, further comprising: determining a scheduling priority for transmitting the data packet based at least in part on the time stamp.

Aspect 20: The method of any of Aspects 17-19, wherein the path associated with the data packet comprises a backhaul adaptation protocol path.

Aspect 21: The method of any of Aspects 17-20, wherein an indication of the time stamp is based at least in part on one or more of: a number of bits allocated for the time stamp, or a resolution of the time stamp.

Aspect 22: The method of Aspect 21, wherein the resolution is associated with a numerology of one or more of a slot or a subframe associated with the data packet.

Aspect 23: The method of Aspect 21, wherein one or more of the number of bits allocated for the time stamp or the resolution of the time stamp is based at least in part on an indication within a header of the data packet.

Aspect 24: The method of Aspect 23, wherein the indication within the header of the data packet is based at least in part on one or more of: a traffic type of the data packet, a channel mapping associated with the data packet, or a number of hops on the path associated with the data packet.

Aspect 25: The method of any of Aspects 17-24, wherein the time stamp indicates one or more of: a frame, a subframe, a slot, or a symbol associated with a numerology configured for the one or more additional IAB nodes, or a delta time from the reference time.

Aspect 26: The method of any of Aspects 17-25, further comprising receiving an indication of one or more of: the reference time, a number bits allocated for the time stamp, or a resolution of the time stamp.

Aspect 27: The method of Aspect 26, wherein receiving the indication of the reference time comprises: receiving an explicit indication of the reference time within a header of the data packet, receiving a partial indication of the reference time within a header of the data packet, or receiving the indication of the reference time in a configuration message received prior to the data packet.

Aspect 28: The method of any of Aspects 17-27, wherein the reference time is based at least in part on one or more of: a periodic numerology-based time, or a periodic time associated with an absolute time.

Aspect 29: The method of Aspect 28, wherein the time stamp is associated with an occasion of the reference time.

Aspect 30: The method of any of Aspects 17-29, further comprising: determining that the data packet includes a time stamp based at least in part on an indication within a header of the data packet.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the memory storing instructions executable by the one or more processors to cause the device to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An integrated access and backhaul (IAB) node for wireless communication, comprising:
    one or more memories; and
    one or more processors, coupled to the one or more memories, the one or more memories storing instructions configurable to be executed by the one or more processors to cause the IAB node to:
        receive a data packet associated with a timing parameter; and
        insert a time stamp into the data packet, based at least in part on the timing parameter, the time stamp associated with a reference time that is known among one or more additional IAB nodes within a path associated with the data packet, wherein a number of bits allocated for inserting the time stamp is based at least in part on an indication within configuration information received by the IAB node.

2. The IAB node of claim 1, wherein the timing parameter is associated with a quality of service parameter.

3. The IAB node of claim 1, wherein the path associated with the data packet comprises a backhaul adaptation protocol path.

4. The IAB node of claim 1, wherein an indication of the time stamp is based at least in part on one or more of:
    the number of bits allocated for inserting the time stamp, or
    a resolution of the time stamp.

5. The IAB node of claim 4, wherein the resolution is associated with a numerology of one or more of a slot or a subframe associated with the data packet, or
    wherein one or more of the number of bits allocated for inserting the time stamp or the resolution of the time stamp is based at least in part on the indication, wherein the indication is within a header of the data packet.

6. The IAB node of claim 5, wherein the indication is based at least in part on one or more of:
    a traffic type of the data packet,
    a channel mapping associated with the data packet, or
    a number of hops on the path associated with the data packet.

7. The IAB node of claim 1, wherein the time stamp indicates one or more of:
    a frame, a subframe, a slot, or a symbol associated with a numerology configured for the one or more additional IAB nodes, or
    a delta time from the reference time.

8. The IAB node of claim 1, wherein the instructions configurable to be executed are further executable by the one or more processors to cause the IAB node to receive an indication of one or more of:
    the reference time,
    or
    a resolution of the time stamp.

9. The IAB node of claim 8, wherein receiving the indication of the reference time comprises:
    receive an explicit indication of the reference time within a header of the data packet,
    receive a partial indication of the reference time within the header of the data packet, or
    receive the indication of the reference time in a configuration message received prior to the data packet.

10. The IAB node of claim 1, wherein the reference time is based at least in part on one or more of:
    a periodic numerology-based time, or
    a periodic time associated with an absolute time.

11. The IAB node of claim 10, wherein the time stamp is associated with an occasion of the reference time.

12. The IAB node of claim 1, wherein a central unit of the IAB node determines, for the reference time, one or more of:
    a format for the time stamp,
    a numerology, or
    a time range for the reference time.

13. The IAB node of claim 1, wherein the instructions configurable to be executed are further executable by the one or more processors to cause the IAB node to:
    insert, into a header of the data packet, an indication that the data packet includes the time stamp.

14. An integrated access and backhaul (IAB) node for wireless communication, comprising:
    one or more memories; and
    one or more processors, coupled to the one or more memories, the one or more memories storing instructions configurable to be executed by the one or more processors to cause the IAB node to:
        receive a data packet having a time stamp associated with a reference time that is known among one or more additional IAB nodes within a path associated with the data packet, wherein a number of bits allocated for the time stamp is based at least in part on an indication within configuration information received by the IAB node; and
        selectively:
            transmit the data packet based at least in part on the time stamp and a current time, or discard the data packet based at least in part on the time stamp and the current time.

15. The IAB node of claim 14, wherein the instructions configurable to be executed are further executable by the one or more processors to cause the IAB node to:
   transmit the data packet based at least in part on the time stamp indicating that the data packet is not expired,
   discard the data packet based at least in part on the time stamp indicating that the data packet is expired, or
   determine a scheduling priority for transmitting the data packet based at least in part on the time stamp.

16. The IAB node of claim 14, wherein the path associated with the data packet comprises a backhaul adaptation protocol path.

17. The IAB node of claim 14, wherein an indication of the time stamp is based at least in part on one or more of:
   the number of bits allocated for the time stamp, or
   a resolution of the time stamp.

18. The IAB node of claim 17, wherein the resolution is associated with a numerology of one or more of a slot or a subframe associated with the data packet.

19. The IAB node of claim 17, wherein one or more of the number of bits allocated for the time stamp or the resolution of the time stamp is based at least in part on the indication, wherein the indication is within a header of the data packet.

20. The IAB node of claim 19, wherein the indication is based at least in part on one or more of:
   a traffic type of the data packet,
   a channel mapping associated with the data packet, or
   a number of hops on the path associated with the data packet.

21. The IAB node of claim 14, wherein the time stamp indicates one or more of:
   a frame, a subframe, a slot, or a symbol associated with a numerology configured for the one or more additional IAB nodes, or
   a delta time from the reference time.

22. The IAB node of claim 14, wherein the instructions configurable to be executed are further executable by the one or more processors to cause the IAB node to receive an indication of one or more of:
   the reference time,
   or
   a resolution of the time stamp.

23. The IAB node of claim 22, wherein receiving the indication of the reference time comprises:
   receive an explicit indication of the reference time within a header of the data packet,
   receive a partial indication of the reference time within the header of the data packet, or
   receive the indication of the reference time in a configuration message received prior to the data packet.

24. The IAB node of claim 14, wherein the reference time is based at least in part on one or more of:
   a periodic numerology-based time, or
   a periodic time associated with an absolute time.

25. The IAB node of claim 24, wherein the time stamp is associated with an occasion of the reference time.

26. The IAB node of claim 14, wherein the instructions configurable to be executed are further executable by the one or more processors to cause the IAB node to:
   determine that the data packet includes a time stamp based at least in part on the indication.

27. A method of wireless communication performed by an integrated access and backhaul (IAB) node, comprising:
   receiving a data packet associated with a timing parameter; and
   inserting a time stamp into the data packet, based at least in part on the timing parameter, the time stamp associated with a reference time that is known among one or more additional IAB nodes within a path associated with the data packet, wherein a number of bits allocated for inserting the time stamp is based at least in part on an indication within configuration information received by the IAB node.

28. The method of claim 27, wherein an indication of the time stamp is based at least in part on one or more of:
   the number of bits allocated for inserting the time stamp, or
   a resolution of the time stamp.

29. A method of wireless communication performed by an integrated access and backhaul (IAB) node, comprising:
   receiving a data packet having a time stamp associated with a reference time that is known among one or more additional IAB nodes within a path associated with the data packet, wherein a number of bits allocated for the time stamp is based at least in part on an indication within configuration information received by the IAB node; and
   selectively:
      transmitting the data packet based at least in part on the time stamp and a current time, or
      discarding the data packet based at least in part on the time stamp and the current time.

30. The method of claim 29, further comprising:
   transmitting the data packet based at least in part on the time stamp indicating that the data packet is not expired,
   discarding the data packet based at least in part on the time stamp indicating that the data packet is expired, or
   determining a scheduling priority for transmitting the data packet based at least in part on the time stamp.

* * * * *